US012731235B2

(12) United States Patent
Handa et al.

(10) Patent No.: US 12,731,235 B2
(45) Date of Patent: Sep. 8, 2026

(54) METHOD AND SYSTEM FOR CHARACTERIZING PERFORATIONS IN A TUBULAR

(71) Applicant: DarkVision Technologies Inc, North Vancouver (CA)

(72) Inventors: Gaurav Handa, Vancouver (CA); Sindhu Hari, Bellevue, WA (US); Mengliu Zhao, Burnaby (CA)

(73) Assignee: DarkVision Technologies Inc

( * ) Notice: Subject to any disclaimer, the term of this patent is extended or adjusted under 35 U.S.C. 154(b) by 282 days.

(21) Appl. No.: 18/385,911

(22) Filed: Nov. 1, 2023

(65) Prior Publication Data

US 2024/0153057 A1 May 9, 2024

(30) Foreign Application Priority Data

Nov. 3, 2022 (GB) ..................................... 2216401

(51) Int. Cl.
*G06T 7/00* (2017.01)
*G01N 29/06* (2006.01)
(Continued)

(52) U.S. Cl.
CPC ....... *G06T 7/0002* (2013.01); *G01N 29/0654* (2013.01); *G06T 7/11* (2017.01);
(Continued)

(58) Field of Classification Search
CPC . G06T 7/0002; G06T 7/11; G06T 7/60; G06T 2200/24; G06T 2207/10132;
(Continued)

(56) References Cited

U.S. PATENT DOCUMENTS 10,781,690 B2 9/2020 Malik et al.
11,238,593 B2 2/2022 Turgutlu et al.
(Continued)

FOREIGN PATENT DOCUMENTS

EP 3367296 A1 8/2018
GB 2602495 A 7/2022
(Continued)

OTHER PUBLICATIONS

He, Kaiming et al. "Mask R-CNN," 2017 IEEE International Conference on Computer Vision (ICCV), Venice, Italy, 2017, pp. 2980-2988.

(Continued)

*Primary Examiner* — Bobbak Safaipour

(57) ABSTRACT

Methods and system of characterizing perforations in a tubular. An imaging tool having an acoustic imaging probe transmits waves and receives acoustic reflections from the tubular. Image segments are processed from the acoustic data. A first trained neural network operates on the image segments to identify processed image segments containing a perforation. A second trained neural network operates on processed image segments containing a perforation to output the location of perforations along the tubular. Another trained neural network can calculate a geometric size of the perforations, such as their size or points along their contour.

23 Claims, 15 Drawing Sheets

(51) Int. Cl.

| | |
|---|---|
| ***G06T 7/11*** | (2017.01) |
| ***G06T 7/60*** | (2017.01) |
| ***G06V 10/764*** | (2022.01) |
| ***G06V 10/77*** | (2022.01) |
| ***G06V 10/82*** | (2022.01) |
| ***G06V 20/70*** | (2022.01) |

(52) U.S. Cl.
CPC .............. *G06T 7/60* (2013.01); *G06V 10/764* (2022.01); *G06V 10/7715* (2022.01); *G06V 10/82* (2022.01); *G06V 20/70* (2022.01); *G01N 2291/023* (2013.01); *G01N 2291/105* (2013.01); *G06T 2200/24* (2013.01); *G06T 2207/10132* (2013.01); *G06T 2207/20021* (2013.01); *G06T 2207/20084* (2013.01); *G06T 2207/20092* (2013.01)

(58) Field of Classification Search
CPC . G06T 2207/20021; G06T 2207/20084; G06T 2207/20092; G06T 7/0004; G06T 2207/20081; G06T 7/10; G06T 7/13; G06T 7/62; G01N 29/0654; G01N 2291/023; G01N 2291/105; G01N 29/06; G06V 10/764; G06V 10/7715; G06V 10/82; G06V 20/70; G06V 10/26; E21B 43/119; E21B 47/0025
See application file for complete search history.

(56) References Cited

U.S. PATENT DOCUMENTS

| | | | | |
|---|---|---|---|---|
| 2018/0073353 | A1* | 3/2018 | Malik | E21B 47/0025 |
| 2019/0204468 | A1* | 7/2019 | Ge | G01V 1/44 |
| 2020/0055196 | A1 | 2/2020 | Halpenny et al. | |
| 2021/0032973 | A1* | 2/2021 | Gkortsas | G01V 1/50 |
| 2021/0142515 | A1* | 5/2021 | Luu | G06T 7/74 |
| 2022/0415040 | A1* | 12/2022 | Khallaghi | G06T 7/136 |
| 2023/0038364 | A1* | 2/2023 | Bhowmick | G06N 3/045 |

FOREIGN PATENT DOCUMENTS

| | | | |
|---|---|---|---|
| GB | 2608149 | A | 12/2022 |
| WO | 2016201583 | A1 | 12/2016 |

OTHER PUBLICATIONS

He, Kaiming et al., “Deep Residual Learning for Image Recognition,” 2016 IEEE Conference on Computer Vision and Pattern Recognition (CVPR), Las Vegas, NV, USA, 2016, pp. 770-778.

Huang, Huimin et al., “UNet 3+: A Full-Scale Connected UNet for Medical Image Segmentation,” ICASSP 2020—2020 IEEE International Conference on Acoustics, Speech and Signal Processing (ICASSP), Barcelona, Spain, 2020, pp. 1055-1059.

Ren, Shaoqing et al., “Faster R-CNN: Towards Real-Time Object Detection with Region Proposal Networks”, arXiv:1506.01497v1, Jun. 4, 2015, pp. 1-10.

Tan, Mingxing et al.,“EfficientNet: Rethinking Model Scaling for Convolutional Neural Networks”, arXiv:1905.11946, Version 5, Sep. 11, 2020, 11 pages.

Zhao, Yongqiang et al., “A New Feature Pyramid Network for Object Detection,” 2019 International Conference on Virtual Reality and Intelligent Systems (ICVRIS), Jishou, China, 2019, pp. 428-431.

* cited by examiner

130

METHOD AND SYSTEM FOR CHARACTERIZING PERFORATIONS IN A TUBULAR

CROSS REFERENCE TO RELATED APPLICATIONS

This application claims priority to GB Application No. GB2216401.6, filed on Nov. 3, 2022, the disclosure of which is incorporated herein by reference in its entirety.

BACKGROUND

Cylindrical conduits such as well casings, tubulars and pipes may be imaged using ultrasound sensors mounted to a tool propelled through the conduit. Existing ultrasound tools comprise an array of piezoelectric elements distributed radially around the tool housing. The top surface of each element faces radially away from the tool towards the wall of the conduit. The reflected waves are received by the same elements and the pulse-echo time of the waves are used to deduce the distances to the internal and external walls and voids therebetween. The elements may be angled slightly off radial, such that some of the energy reflects away from the transducer and some backscatters off features, per PCT Application WO 2016/201583 published Dec. 22, 2016 to Darkvision Technologies.

SUMMARY

The present embodiments include a method and system to identify perforation candidates in a logged well from ultrasound images using a computer model. The model is a machine learning model having several neural networks. The present system may output metrics and characteristics of the detected perforations.

In one general aspect, method generates processed image segments, based on a received acoustic data for acoustic reflections from the tubular. The method includes convolving a first trained neural network with the processed image segments to identify processed image segments containing a perforation. The method includes convolving a second trained neural network on those processed image segments containing a perforation to output a bounding box that locates the perforation along the tubular. Other embodiments of this aspect include corresponding computer systems, apparatus, and computer programs recorded on one or more computer storage devices, each configured to perform the actions of the methods.

Implementations may include one or more of the following features. Method where the first trained neural network is a classification network that outputs a label estimating a probability of a given processed image segment containing a perforation. Method where the first trained neural network comprises a Convolutional Neural Network and a Long Short Term Memory network. Method where the first trained neural network comprises an UNET network. Method where the first trained neural network comprises a first network part to output a feature for each of the processed image segments and a second network part that combines features for a sequence of the processed image segments to output the label that identifies perforations. Method where the corresponding location is within a thickness of the tubular. Method convolving a third trained neural network on a subset of the received acoustic data based on the bounding box to determine a geometric characteristic of the perforation. Method where generating the processed image segment includes creating a single-channel image segment, where each region of the single-channel image segment includes a maximum measured intensity from a corresponding location of the received acoustic data. Method where generating the processed image segment includes creating a multi-channel image segment, where each region of the multi-channel image segment includes (i) a maximum measured intensity, (ii) a maximum measured intensity between an inner surface and an outer surface of the tubular, and (iii) a maximum measured intensity at the outer surface of the tubular at a corresponding azimuthal and axial location of the received acoustic data. Method may include dividing the processed image segment into a plurality of smaller processed image segments prior to the step of determining the bounding box. Method generating processed image segments, based on a received acoustic data for acoustic reflections from the tubular. Method where the image segment is a cross-view having dimensions corresponding to radial (r) and azimuthal (ϕ) directions of the tubular. Method where the image segment is a tube view having dimensions corresponding to axial (z) and azimuthal (ϕ) directions of the tubular. Method where the geometric characteristics include a size of the perforation. Method where the key points include a start point and an end point of the perforation. Method where the processed image segments have dimensions corresponding to azimuthal (ϕ) and axial (z) directions of the tubular. Method where the processed image segments have dimensions corresponding to azimuthal (ϕ) and radial (r) directions of the tubular. Method where determining characteristics includes measuring the size of the perforation by spline fitting the start point and the end point. Method may include rendering and outputting an image from the acoustic data based on least one of the identified processed image segments that contain a perforation. Implementations of the described techniques may include hardware, a method or process, or a computer tangible medium.

In one general aspect, a method determined characteristics of a tubular by: generating, based on a received acoustic data, an image segment containing a perforation and a corresponding bounding box around the perforation; identifying key points of the perforation in the image segment using a trained neural network model; determining, based on the key points, geometric characteristics of the perforation. Other embodiments of this aspect include corresponding computer systems, apparatus, and computer programs recorded on one or more computer storage devices, each configured to perform the actions of the methods.

In one general aspect, a system includes an acoustic probe having a plurality of ultrasonic sensors, each sensor capable of transmitting and receiving ultrasonic waves, where the acoustic probe is configured to generate acoustic data. The system includes at least one processor. The system includes at least one memory storing a first and a second trained neural network. The system includes the least one memory communicatively coupled with the at least one processor and storing machine-readable instructions that, when executed by the processor, cause the processor to: implement the methods. Other embodiments of this aspect include corresponding computer systems, apparatus, and computer programs recorded on one or more computer storage devices, each configured to perform the actions of the methods.

The processor and the memory may be located at a remote data center. The system may include an user interface capable of displaying a rendered image and capable of receiving user prompts indicating which image segments contain a perforation. Implementations of the described techniques may include hardware, a method or process, or a computer tangible medium.

A method of characterizing a perforation in a tubular may include (i) generating, based on a received acoustic data, a processed image segment having dimensions corresponding to azimuthal (ϕ) and axial (z) directions of the received acoustic data, wherein the processed image segment is generated from a non-overlapping axial segment of the received acoustic data, (ii) identifying a perforation within the processed image segment, (iii) determining, within the processed image segment, a bounding box that contains the perforation, and (iv) determining, using a subset of the received acoustic data based on the bounding box, a characteristic of the perforation.

A method of characterizing a perforation in a tubular may include (i) generating, based on a received acoustic data, a plurality of cross-view images, each cross-view image having dimensions corresponding to radial (r) and azimuthal (ϕ) directions of the received acoustic data within an axial region having a perforation, (ii) identifying key points of the perforation in one or more of the plurality of cross-view images, and (iii) determining, based on the key points, characteristics of the perforation, the characteristics including a size of the perforation.

DETAILED DESCRIPTION

In downhole imaging tools, transmitted waves are reflected off of the tubular and are image processed to generate a two-or three-dimensional geometric model of the tubular, then rendered for visualization at a monitor. However, embodiments herein realize that there may be numerous errors in the logging process that need to be corrected to represent the surface smoothly. The reflected signals often contain noises from particles in the fluid, secondary reflections, and ringing in the tubular material. Moreover, there can be dead sensor elements or the whole imaging tool can be decentralized. This tends to lead to discontinuities and skewing in the visualization, even through the conduit is generally cylindrical with a smooth surface. For example, perforations in the oil wells have various shapes and sizes and may appear at various locations. In ultrasound images, the perforations appear as locations of less intense signals. These signals are difficult to identify as they many times resemble other random noise signals present in an ultrasound image. Previously, capturing the accurate shape and size of these perforations with a high level of confidence has been a difficult task. The present embodiments solve these problems using a multistep data pipeline to accurately locate and size the perforations.

Figure 1:
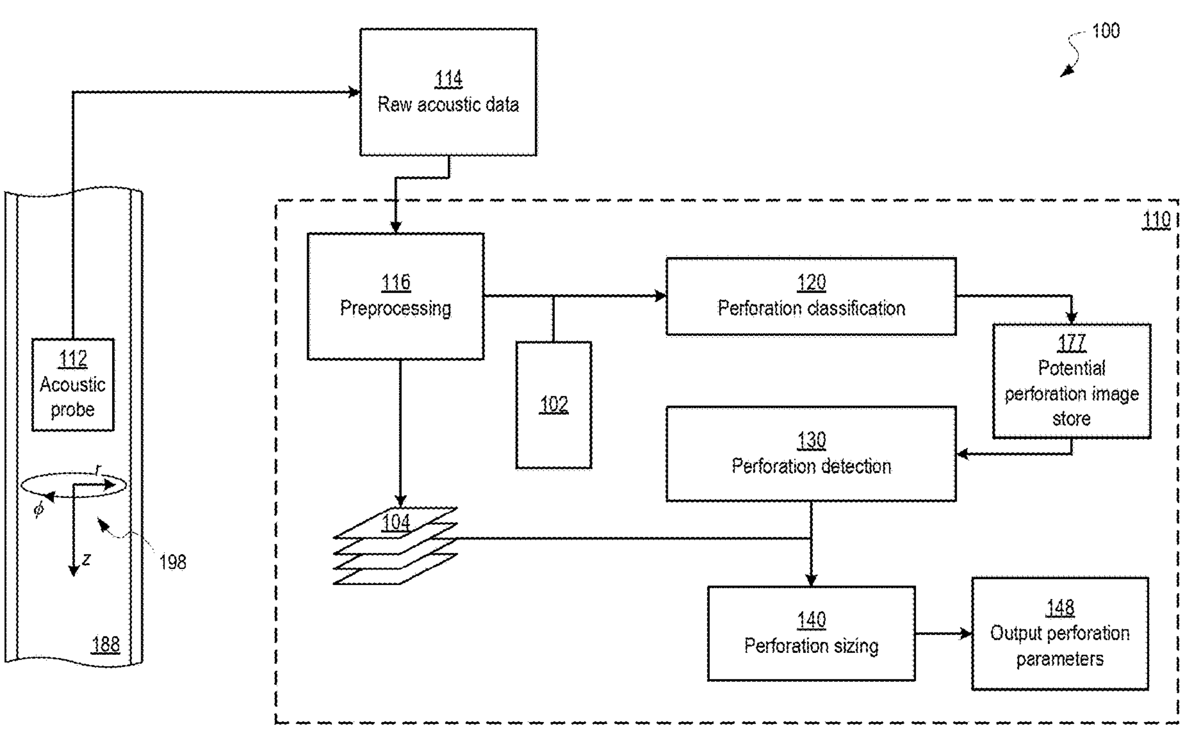
FIG. 1 is a flowchart illustrating a method of characterizing a perforation in a tubular, in an embodiment.

FIG. 1 is a flowchart illustrating a method 100 of characterizing a perforation in a tubular. Herein, the term tubular refers to any downhole cylindrical conduit, such as a well casing, or a tubular. Method 100 includes receiving raw acoustic data 114 from an acoustic probe 112 for a plurality of axial sections as acoustic probe 112 is moved axially in a wellbore. Raw acoustic data 114, which may be ultrasound scanning data, is captured and processed in a computing apparatus 110. Computing apparatus 110 may be a remote server, such as a cloud service. Computing apparatus 110 may be a plurality of computing devices, each performing one or more processing steps disclosed herein. Raw acoustic data 114 may also be captured locally and uploaded to a computing apparatus 110, where further processing may take place.

In embodiments, acoustic probe 112 includes an array of transducers that uses beamforming to capture images of a downhole casing 188. Casing 188 may be any cylindrical conduit, such as a well casing, a tubular, or any pipeline. The transducers are preferably a phased array operating in the ultrasound band. Examples of acoustic probe 112 include, but are not limited to, the acoustic probes exemplified by: U.S. Pat. No. 10,781,690 filed 6 Oct. 2016 and entitled "Devices and methods for imaging wells using phased array ultrasound" and Patent Applications US20200055196A1, filed 13 Aug. 2019 entitled "Device and Method to Position an End Effector in a Well", both incorporated by reference.

Typically, raw acoustic data 114 are captured as frames from the whole array, while acoustic probe 112 is conveyed through casing 188 to log a long section of the casing. The receive circuitry captures acoustic reflections in N receive channels, where N may be the number of elements on the array or number of scanlines from beamforming. Herein, the input data is represented in an axis system 198 that includes three main axes: ϕ, r and z, where the z axis is the axial direction or the logging axis, separated in time by frames; r is the radial distance from the transducer array (or major axis of acoustic probe 112), in directions transverse to the logging axis, measurable in time-sampled pixels or physical distance; and $\phi$ corresponds to the azimuthal angle of a scan line in a transverse plane. One representation of the acoustic data is a tube view, in which average intensities of acoustic data over the thickness of the tubular in the r axis for each scan line are presented in the $\phi$-z plane. In effect, the entire well or pipe may be represented by a sequence of two-dimensional segments in the tube view, where every region or pixel along the $\phi$ axis at a given z, may represent averaged line intensities. Hence, a tube view shows the averaged intensities over the thickness of the tubular for the entire circumference of the tubular over a given axial length in a flat two-dimensional image. The size of the image to process may be based on the estimated apparatus size. Examples of tube view images are shown below with reference to FIG. 2.

Additionally, images in the r-$\phi$ plane, referred to as a cross view, represent the acoustic data collected from a cross-sectional slice of the tubular at a specific axial position (z) within the wellbore or logging time instant (t). Thus, a single cross-view image as used herein represents a r-$\phi$ slice of transducer data at specific axial position (z) within the wellbore or logging time instant (t). Cross-view images may further span a range of $\phi$—in other words, for a specific axial position (z), there may be four (or more, or fewer) cross-view images: a first cross-view image spanning $\phi_{z1}$(0°-90°); a second cross-view image spanning $\phi_{z1}$(90°-180°); a third cross-view image spanning $\phi_{z1}$(180°-270°); and a fourth cross-view image spanning $\phi_{z1}$(270°-360°). Examples of cross-view images are shown below with reference to FIG. 5C.

In a use scenario, a plurality of cross-view images in the r-$\phi$ plane may be generated or selected from a previously generated set of cross-view images at a plurality of axial positions (z) within an axial range of an identified perforation for a detailed characterization of the perforation. In such an example, identifying a perforation using tube-view images may proceed the detailed characterization of the perforation. As such, for clarity, hereinafter, references to an image refer to tube-view images unless specified otherwise. Additionally, since the elements of images are translated from acoustic data, the term processed image is used interchangeably with image herein, but both terms refer to the same image.

Image segment selection preferably involves only images that have been collected from a tubular. Invalid regions, including faulty hardware or images for which the acoustic sensor has not yet been inserted, need not be processed. This a priori knowledge may be provided from a human operator as entries in a database, or as the result of an additional processing.

Even for valid segments, it might not be desirable to process all images uniformly along the tubular due to the sheer number of images. Given that the tubular boundary is smooth and changes slowly as the acoustic sensors move through it, only a subset of these image segments may be processed. For example, image segments may be processed at a certain interval, or an additional processing may determine which segments to process.

The image size of the segment selected for processing preferably relates (in terms of pixels) to the size of the processor that can be stored for efficient matrix operations and relates (in terms of physical units) to the size of the apparatus. These are both related by the ultrasound scan resolution (pixels/mm or pixels/radian). For example, a segment may represent 0.5 meters to 2 meters in axial direction or may be 200-1000 pixels in either azimuthal or axial dimensions (not necessarily a square).

The resulting image from raw three-dimensional ultrasound data may have a millimeter-scale resolution. The data may be stored raw, demodulated, or data compressed into a local storage and then transmitted to a remote computing apparatus 110 for further image processing, as described hereinbelow.

As an example, acoustic probe 112, which may include a radial array of 256 ultrasound transducer elements, captures raw acoustic data 114 including cross sectional frames of a tubular at a given axial position. Computing apparatus 110, using raw acoustic data 114, first performs preprocessing 116 to create two streams of images: (i) tube view images 102 and (ii) cross-view images 104. In some embodiments, cross-view images 104 are created when a perforation has been identified in a tube view image 102. Preprocessing 116 may alternatively be performed locally prior to raw acoustic data 114 being captured by computing apparatus 110. The tube view image 102 may be created by calculating the maximum intensity of ultrasound signal received by each sensor element as the probe containing sensors traverses in axial direction in a casing well or a pipe. For example, for an acoustic array having Y transducer elements capturing an axial distance Z along the tubular, results in a tube-view image segment of size Z×Y. Each acquisition step may represent the same axial distance, the axial distance which the probe travels in the same amount of time, or some arbitrary axial distance. Furthermore, images comprising the maximum intensity of ultrasound signals by each channel described above are referred to as single-channel images.

Additionally, preprocessing 116 may include adjustments based on, for example, locations of the sensors in the acoustic probe. For example, the angle of ultrasound signal emitted from the sensors may be a factor for the adjustments as the angle of ultrasound signal may result in compressing or stretching a perforation in the processed image. Preprocessing 116 may also include normalizing the images. For example, the images may be normalized at image level or sensor level to even out intensities across different scans and different portions of the casing well or pipe.

Figure 2:
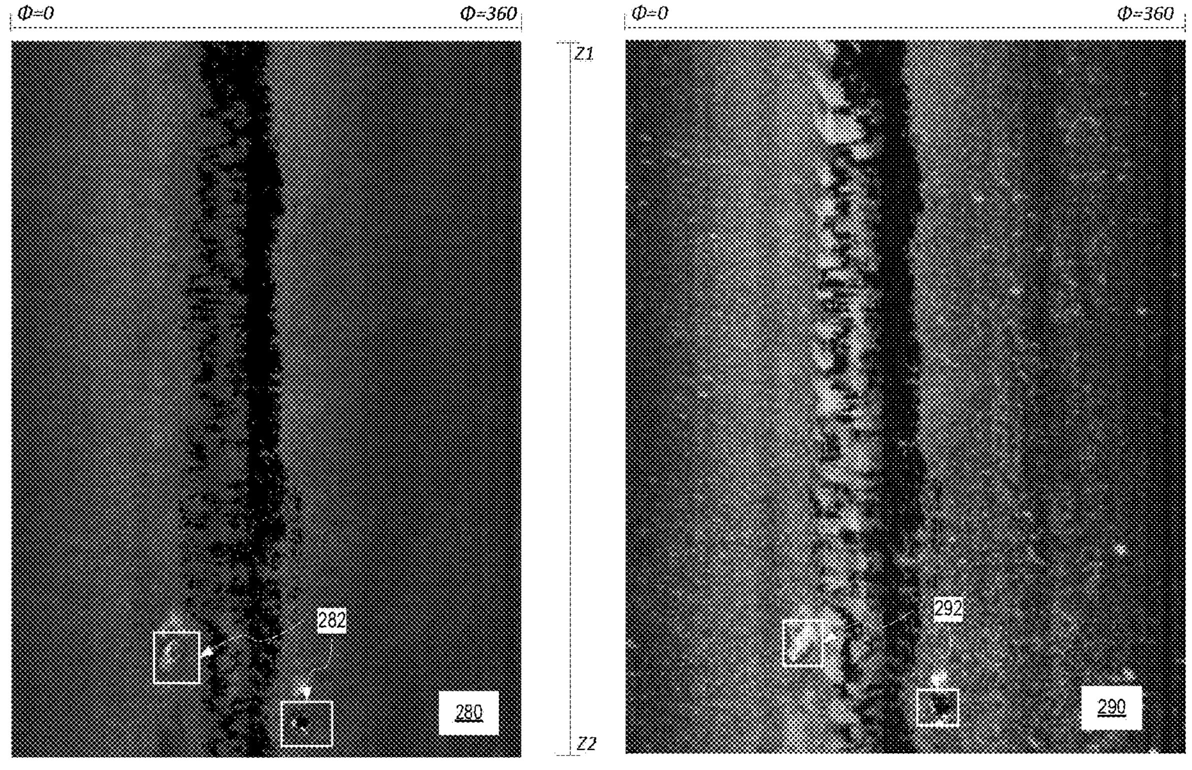
FIG. 2 shows example processed images.

FIG. 2 shows example processed images 280 and 290. The processed images 280 and 290 are a single-channel and a three-channel tube view images, respectively. A tube view image presents the acoustic data in the $\phi$-z plane using the axis system 198 in FIG. 1. For example, processed image 280 is shown in the $\phi$-z plane with the z axis spanning from an axial position z1 to an axial position z2, and the $\phi$ axis spanning from $\phi$=0° to $\phi$=360°, the entire circumference of the tubular, represented as a flat two-dimensional image.

A processed image may be a single-channel (or greyscale) image, such as processed image 280, created by calculating the maximum intensity of ultrasound signal from a radial distance $r_1$ to $r_2$ from the sensor element, where $r_1$ is a radial distance to, for example, the inner surface of the well, and $r_2$ is to, for example, the outer surface of the well. The radial distance $r_1$ to $r_2$ may be based on prior information regarding the size of pipe or casing well. The radial distance $r_1$ may be obtained from a machine learning model which predicts the distance of the inner surface and $r_2$ may be the sum of $r_1$ and the thickness of the casing well or pipe.

The processed image may also be a multi-channel image, in which each channel of the multi-channel represents an additional data. For example, the processed image may be a three-channel (or composite) image, such as processed image 290. The three channels in this example include (i) one channel comprising a single-channel image described above, (ii) maximum intensity of ultrasound signal of each sensor element from inner surface to outer surface, and (iii)

maximum intensity of ultrasound signal of each sensor element around outer surface of fixed thickness.

After preprocessing 116, perforation classification 120 is performed using tube view images 102. Because pipes and wells are typically several thousand meters long, tube view images 102 are segmented into smaller segments, which may later be recombined for visualization of the longer pipe or well. A sequence of the entire scan image (pass) segments in tube view are run through an image-based classification method. The classification method is a deep learning-based model that classifies each image segment into two categories: images having one or more potential perforation clusters and images without potential perforation clusters. For example, processed images 280 and 290 denote respective locations 282 and 292 that are classified as having potential perforations. The images classified as potentially having one or more perforations may be stored in a potential perforation image store 177 for further processing.

After the image segment is classified to include one or more potential perforation clusters, perforation detection 130 is performed, for example by computing apparatus 110, using the same image segments in tube view used in perforation classification 120. The image segments may be obtained from potential perforation image store 177. Perforation detection 130 is also an image-based detection method based on a deep learning-based model that localizes individual perforations using the same tube view. The output of perforation detection 130 includes a bounding box around each identified perforation.

The next step is perforation sizing 140. Perforation sizing 140 first detects key points of each perforation, such as end points specifying the start and end of a perforation, using image clusters in cross-view images 104 that may be within the bounding box identified in perforation detection 130. Cross-view images 104 are convolved with a key point model, preferably a deep learning model. Perforation sizing 140 then performs a spline fitting to the key points and provides output perforation parameters 148, which include, for each perforation, area, diameter, length, width, and midpoint. An example of spline fitting is shown below with reference to FIG. 5B.

Figures 10A, 10B:
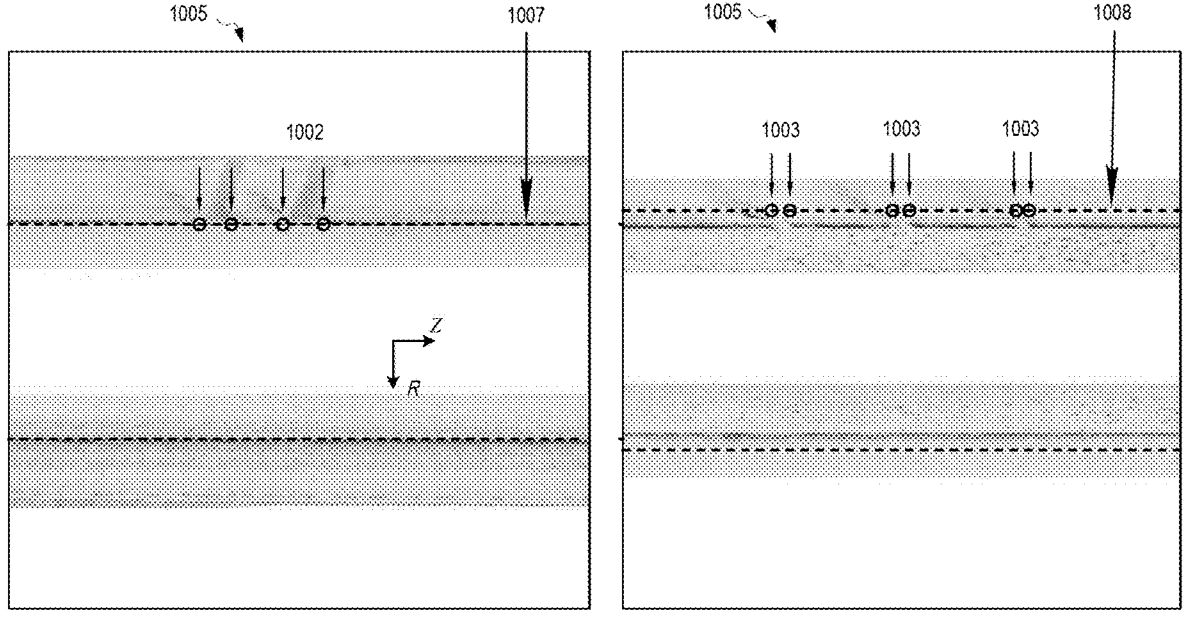
FIG. 10A is an axial-section display of a tubular cut through a perforation showing the detected entry hole extremes.
FIG. 10B is an axial-section display of a tubular cut through a perforation showing the detected exit hole extremes.

To further increase the accuracy of locating the top and bottom of the perforation (in the tubular's axial direction) the system may process the ultrasound image in an axial-section view. This axial-section view 1005 is created by intersecting the tubular with a 2D plane in R-Z such that it passes through the axis of the tubular, as exemplified by the ultrasound image of FIG. 10. This image view is convolved with a key point model for detection of top and bottom axial key points 1002 (entry key points) and 1003 (exit key points). This key point model may use the same key point model architecture (e.g. Mask R-CNN) used for the cross-view, but trained on ultrasound images in this axial-section view with labeled top and bottom axial key points. As accurate top and bottom points of each identified perforation can be localized using the axial-section view, then the width of a perforation along all slices is computed by finding the start-end key points 591 using a cross-view images 104. FIG. 10A shows an axial-section view 1005, cut axially through the tubular to include a detected perforation. Dotted line 1007 represents the detected inner surface of the tubular, along which four key points 1002 are located. These indicate the top and bottom key points on the inner surface where the perforation projectile entered the casing (entry hole). Dotted line 1008 represents the detected outer surface, along which six key points 1003 are located. These indicate the top and bottom key points on the outer surface where the perforation projectile exited the casing (exit hole).

Output perforation parameters 148 may also include other features of the tubular. For example, other features may include ovality of the tubular using an ellipse fit to the boundary, wall thickness of the tubular over a region, speed of sound correction for the fluid from knowledge of the tubular diameter versus time-of-flight (ToF) of the ultrasound to the determined surface. Other features may also include dents (low frequency variation in radius), surface corrosion (high frequency variation in radius), and locations of any sand build-up.

Method 100 may also include an image rendering step, that may include selectively operating on the image data for visualization. These operations may include filtering, contrasting, smoothing, or hole-finding of the image data. For example, the rendered image may have a part of image data (i.e., set pixels to clear) excluded for visualization, such that only pixels within some width of the identified features, such as perforations, are rendered. This type of rendered image may be useful for visualizing the tubular itself with any identified surface features, such as cracks and perforations. Alternatively, the external image data beyond the tubular may be excluded for visualization to render only acoustic reflections from particles in the fluid. Alternatively, the internal image data may be excluded in the rendered image for visualizing only acoustic reflections from the external cement bond, rock formation or any apparatus attached to the tubular.

Figure 3:
FIG. 3 is a flowchart of a method for perforation classification, which may be used in the method of FIG. 1, in an embodiment.
Figure 3:
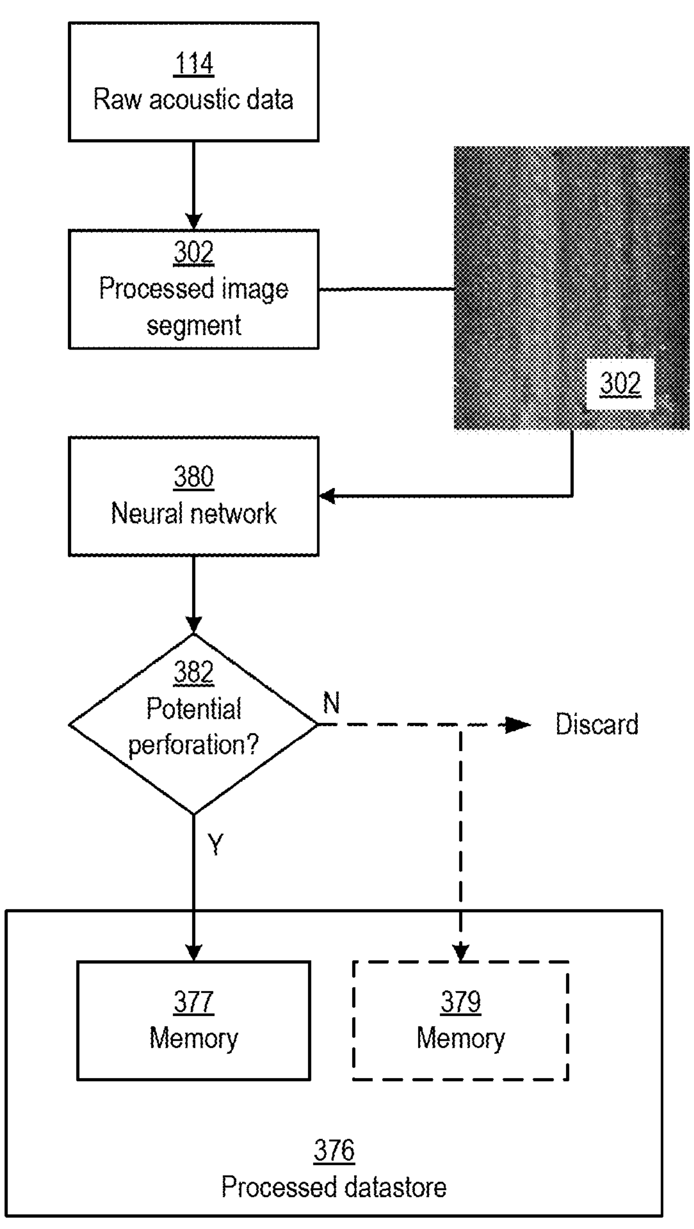

FIG. 3 is a flowchart of a method for perforation classification, which may be used standalone or to implement perforation classification 120 in the method of FIG. 1. Perforation classification 120 includes a neural network 380. Neural network 380 receives as input a processed image segment 302. Perforation classification 120 classifies whether at least one perforation is present in processed image segment 302. Processed image segment 302, as are the images shown in FIG. 2, is an example of tube view image 102. A perforation is classified as present if processed image segment 302 includes at least one potential perforation, whether the perforation is in a full or partial form. This classification at the level of an image segment allows focused processing in the remaining steps of method 100, thereby improving overall accuracy and reducing total processing time and computing resources. The output of classification may be a label, which may be a binary indication or probabilistic measure that a perforation exists within the convolved image segment.

In certain embodiments, neural network 380 is a deep learning model based on convolutional neural network (CNN) models for classifying perforations in acoustic images. The CNN models are desirable because they are largely spatially invariant and computationally efficient, especially when run on a graphics processing unit (GPU) or a tensor processing unit (TPU). In these embodiments, CNN architectures of the types typically used for three-channel images, such as color images taken with a camera, for identifying common objects are adapted to identify certain features in images made from acoustic data.

One example of the CNN model used in neural network 380 is based on EfficientNet, as described in *EfficientNet: Rethinking Model Scaling for Convolutional Neural Networks* by Mingxing Tan and Quoc V. Le, arXiv:1905.11946 and is hereby incorporated by reference. EfficientNet is an image classification algorithm that uses a balanced depth scaling, width scaling and resolution scaling of the CNN model to achieve better accuracy-complexity tradeoff. The scaling method uses a compound coefficient to uniformly scale across depth, width, and resolution. The loss function for optimizing the CNN network is binary focal loss, as it is a binary classification with significant class imbalance. Focal loss function down-weights examples classified as highly accurate and focuses on examples that are more difficult to classify.

Figure 11:
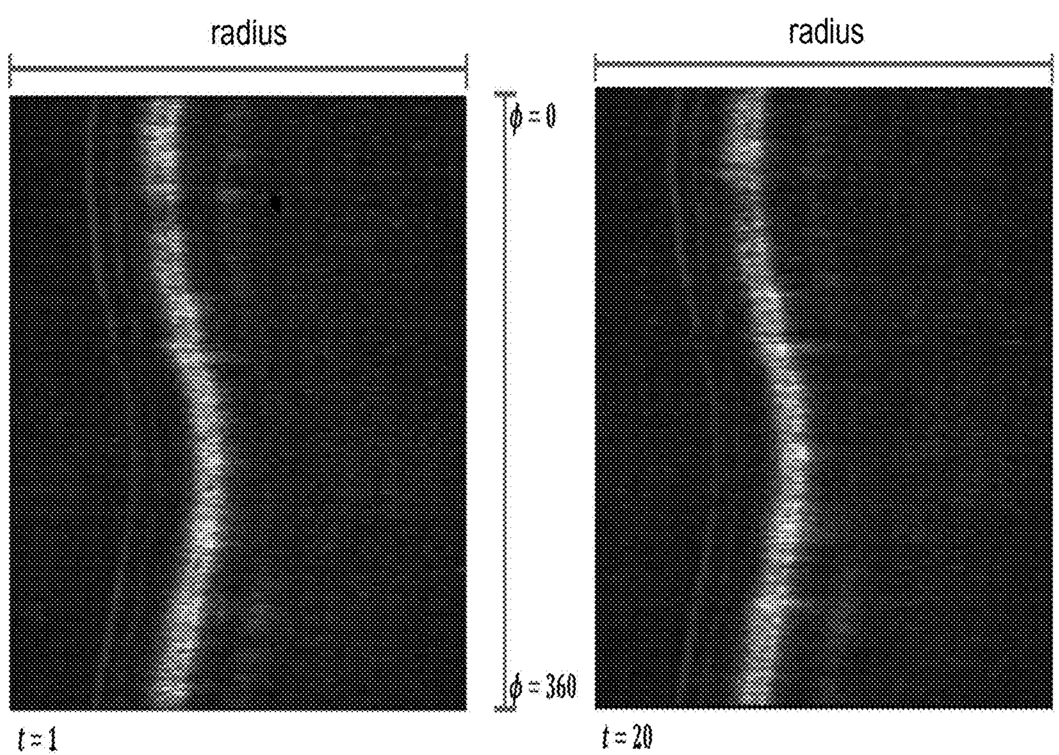
FIG. 11 shows raw ultrasound images of a tubular at two frames.
Figure 12:
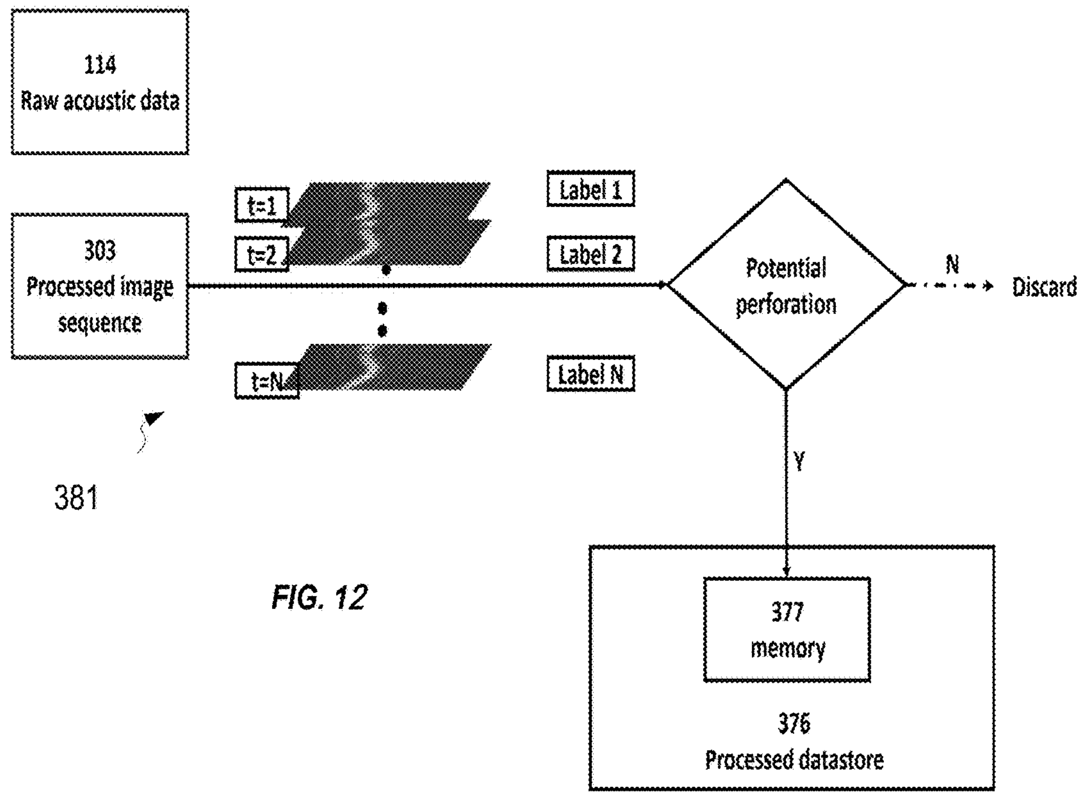
FIG. 12 is a block diagram for perforation classification, in another embodiment.
Figure 13:
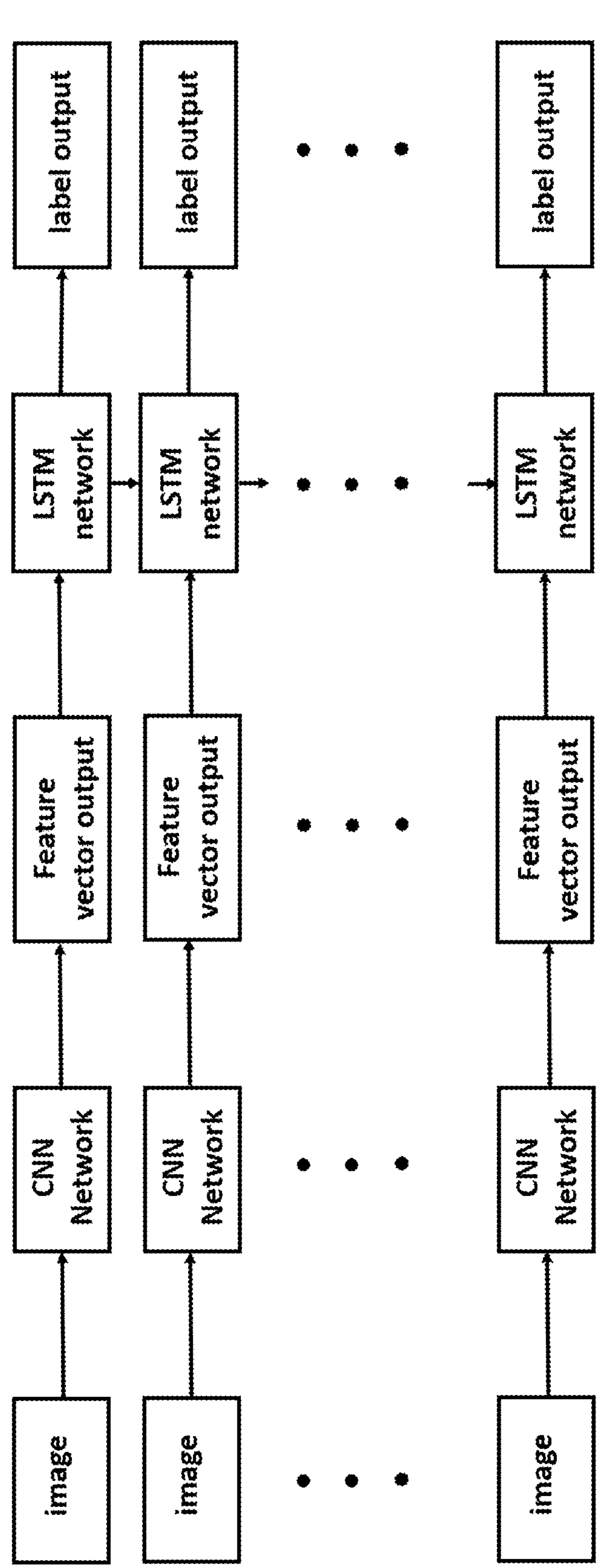
FIG. 13 is a flowchart for processing raw ultrasound images with a neural network to output a label for each frame.

Alternatively, perforation classification 121 may be performed using neural network 381, which receives a sequence of processed images as input, as shown in FIG. 12. In this embodiment, perforation classification 121 classifies whether each slice in the sequence 303 contains a perforation or not. Two slices from processed image sequence 303 are shown in FIG. 11, is an example of two raw view images at time 1 and 20. Network 381 outputs a sequence of labels, which label may represent a class or probability of a given class within that slice, and the sequence length is of the same as the sequence length of the input images. The output sequence of labels will indicate whether each slice of the input images contains a perforation or not.

Neural network 381 may be a deep learning model having two parts: a CNN and a LSTM (Long Short Term Memory) models for classifying perforations in acoustic images. The CNN operates on each image segment to output a feature or set of features describing the image. The LSTM model can be used to combine information from a sequence of image segments (e.g. all features from all images in the same sequence, rather than predicting a class based on a single slice). The output is a label indicating a probability of whether the sequence of image segments contain a perforation or not.

For training the model, a dataset is constructed with images having perforations and images without perforations to create a balanced dataset of images with and without perforations. The trained model is validated on balanced datasets and datasets having a class imbalance. The threshold for prediction probability is selected to optimize lowering false positives. Additionally, training dataset for each neural network model described herein may include characteristics, such as orientation angles, intensities, geometry and sizes of perforations as they relate to their corresponding features in acoustic images. The training dataset may be generated by data-augmentation of collected acoustic images that have identified regions or pixels. The training dataset may also include augmented images that have been flipped around an axis, changed in brightness and contrast of the image, without affecting the identified regions. Another example of the CNN model used in neural network 381 is based on ResNet, as described in *Deep Residual Learning for Image Recognition*, CVPR 2016. ResNet adds residual connections to different CNN layers, so as to help retain features of fine details, such as perforations.

For classifying three-channel processed images, such as processed image 290 in FIG. 2, neural network 380 may utilize convolutional kernel based deep learning model. This model is also based on EfficientNet but modified for three channels images (e.g., RGB images).

Additionally, in some embodiments, perforation classification 120 includes an ensemble of more than one deep-learning model. For example, if all deep-learning models included in the ensemble predict the probability of an image having a perforation higher than a threshold, the ensemble has a higher probability of predicting a perforation. This methodology may reduce false positives and improve the prediction accuracy.

Neural network 380 has an output 382. If output 382 of neural network 380 indicates that image segment 302 includes a potential perforation, processed image segment 302 may be stored in a memory 377, which is an example of potential perforation image store 177 in FIG. 1, in a processed datastore 376 for further processing by the step of perforation detection 130. If, on the other hand, output 382 does not indicate a potential perforation, processed image segment 302 may be discarded or further stored in a memory 379 in processed datastore 376 or a possible reprocessing. Consequently, perforation detection 130 receives as input processed image segment 302 from memory 377 classified as potentially having one or more perforation by perforation classification 120.

Figure 4:
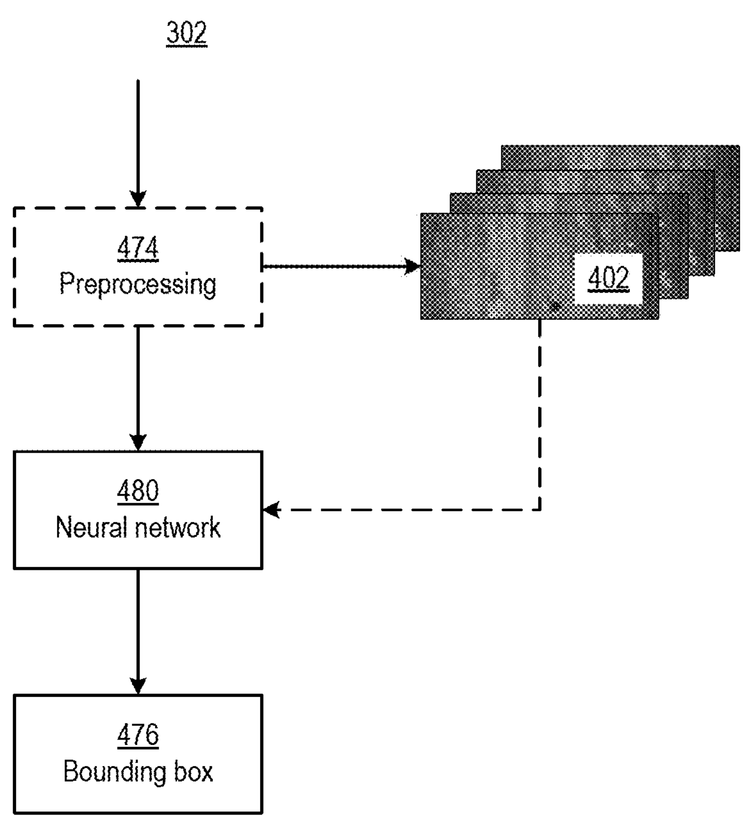
FIG. 4 is a flowchart of a method for perforation detection, which may be used in the method of FIG. 1, in an embodiment.

FIG. 4 is a flowchart of a method for perforation detection, which may be used standalone or to implement perforation detection 130 of FIG. 1. Perforation detection 130 includes a neural network 480 that, after processing processed image segment 302, outputs a bounding box 476, the area in which the identified perforation exists in processed image segment 302. From knowledge of the bounding boxes locations, the system can locate all identified perforations along the tubular.

Furthermore, perforation detection 130 may include a preprocessing 474 of processed image segment 302. For example, processed image segment 302 may be further divided into multiple non-overlapping image segments 402, to create a smaller input to neural network 480. A smaller input facilitates training of neural network 480 of higher complexity and may lead to better overall accuracy.

Neural network 480 localizes the identified perforation in processed image segment 302. In certain embodiments, neural network 480 is a deep learning model based on the CNN model. The CNN model used in neural network 480 is based on Unet3plus, as described in *UNET3+: A Full-scale Connected UNET for Medical Image Segmentation* by Huimin Huang et al., arXiv2004:08790 and is hereby incorporated by reference. Unet3plus is a biomedical image segmentation model which segments areas of interest. The loss function for optimizing the CNN network is binary sigmoid focal cross entropy to account for the size of the perforation in relation to the background.

Another embodiment of neural network 480 is described in *Faster R-CNN Towards Real-Time Object Detection with Region Proposal Networks*, Advances in neural information processing systems. 2015; 28 by Shaoqing Ren, and is hereby incorporated by reference.

The output of neural network 480 includes bounding box 476 around each perforation identified in an image segment 302 or 402. Because bounding boxes 476 are used as an input to the step of perforation sizing 140 in FIG. 1, validation criteria for the trained model highlight the accuracy of identifying each perforation, such that the criteria include: (i) overall prediction accuracy, (ii) the number of identified perforations over the number of true perforations, and (iii) the number of falsely identified perforations. Validation criteria may also include other evaluation metrics commonly used in the art including Intersection-over-union (IoU) and DICE coefficient for segmentation. The resulting bounding box 476 may have dimensions corresponding to the low and high coordinates of the image segment having an identified perforation in two dimensions. For example, the two dimensions may be represented in the x and y directions, where the x direction may be the azimuthal direction, and the y direction may be the axial direction of the acoustic probe 112.

Figure 5A:
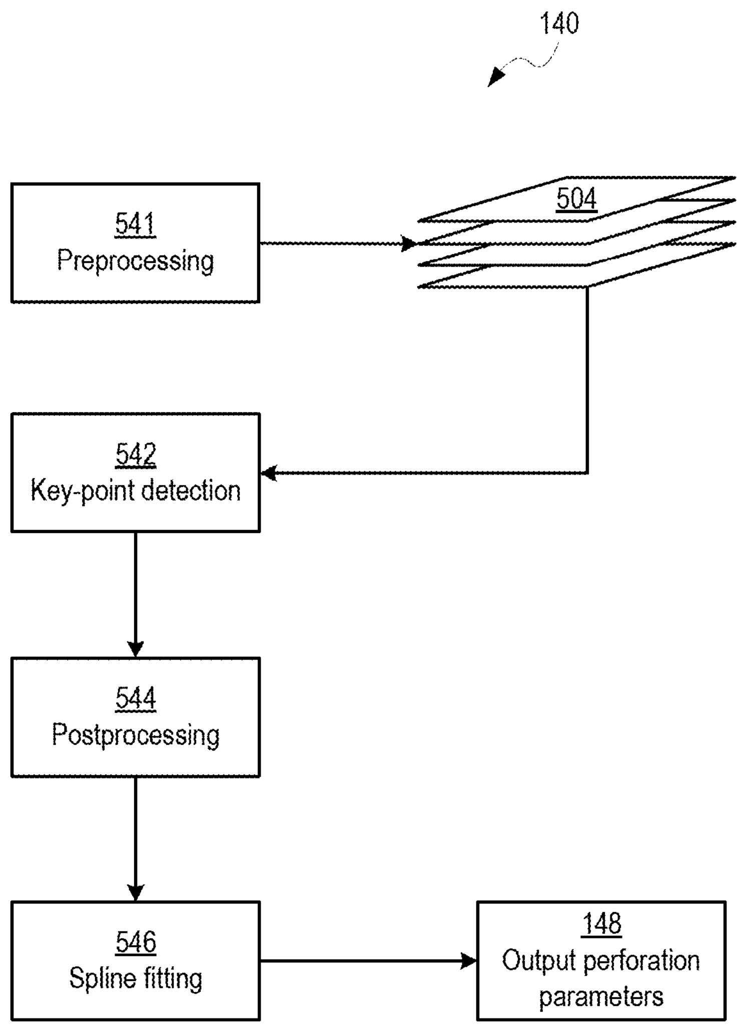
FIG. 5A is a flowchart of a method for perforation sizing, which may be used standalone or as a step used in the method of FIG. 1, in an embodiment.

FIG. 5A is a flowchart of a method for perforation sizing 140, which may be used standalone or as a step used in method 100 of FIG. 1. For example, the images that are to be sized may be the same image segments identified as containing a perforation by neural net 480, more preferably focused on the image portions within the bounding box. Alternatively, the sizing step may use images that were manually labelled as containing a perforation by a used via a user interface.

Figure 5B:
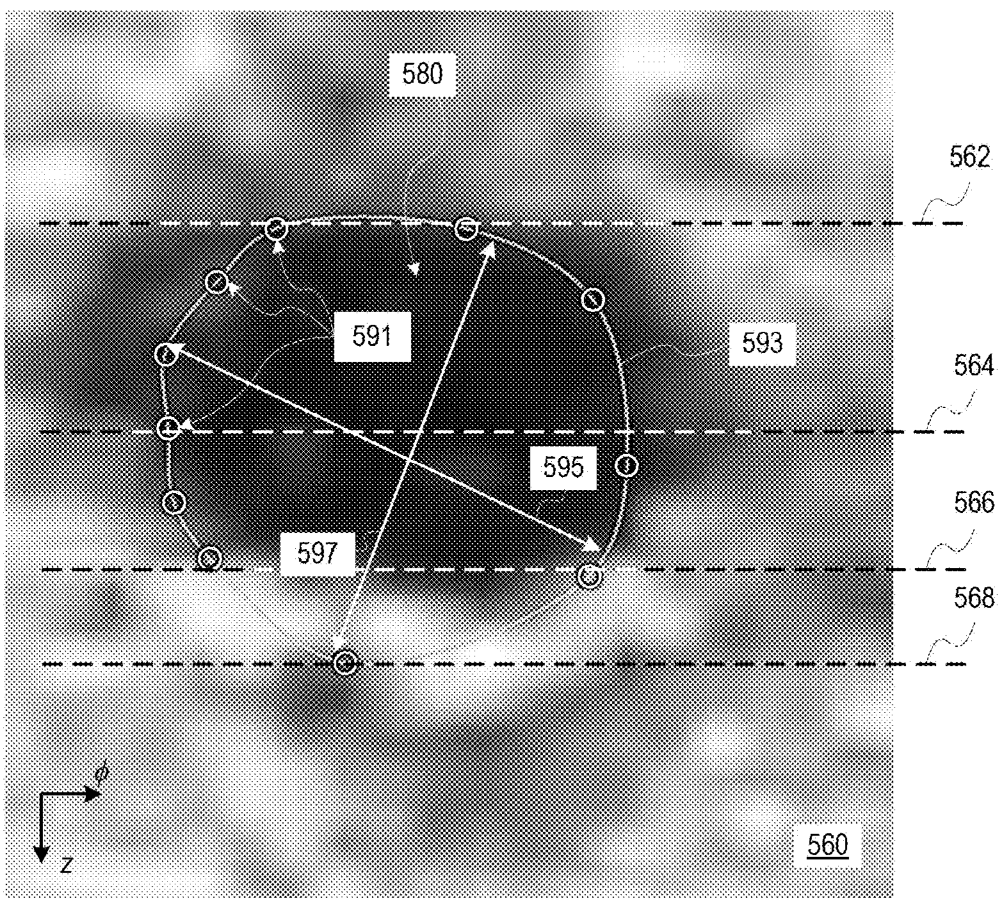
FIG. 5B is an example tube view image showing a perforation and keypoints.
Figure 5C:
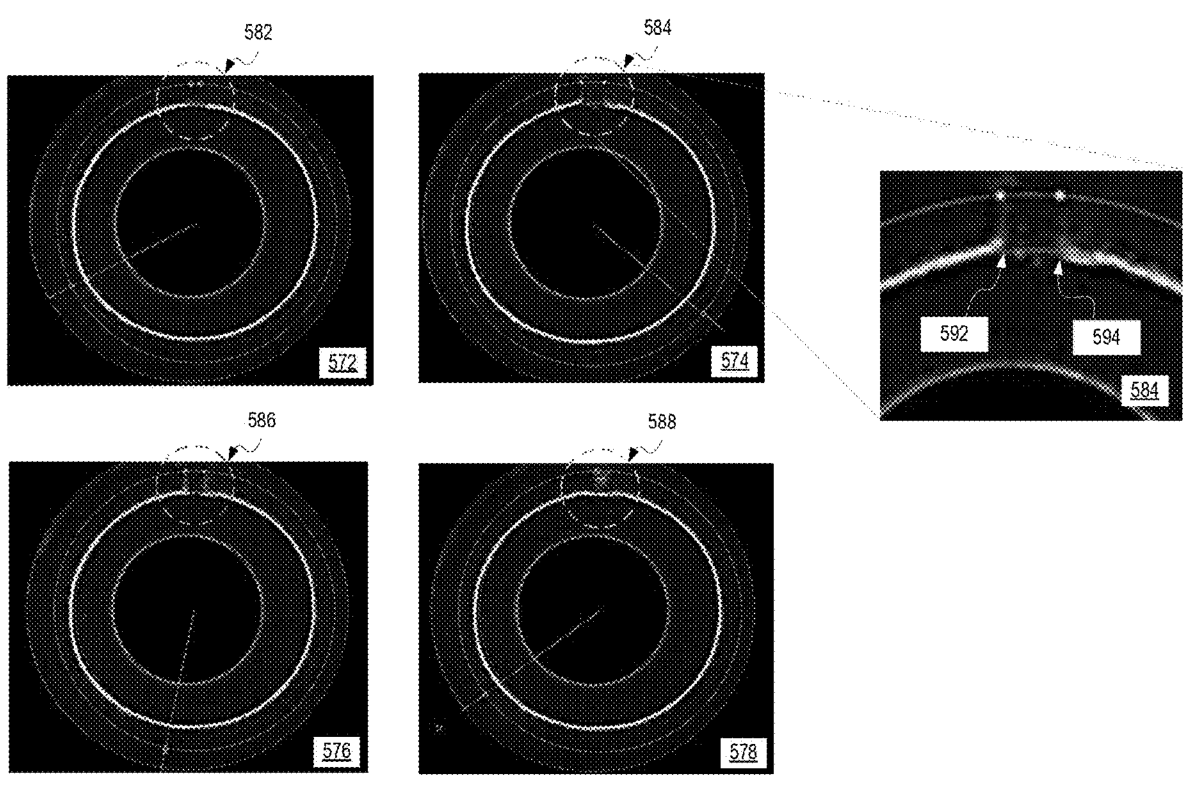
FIG. 5C shows cross-view images within the axial boundary of the detected perforation of FIG. 5B.

Perforation sizing 140 accurately maps the location and produces perforation parameters including the geometric characteristics, such as shape and size of each perforation. FIG. 5B is an example tube view image showing a perforation. FIG. 5C shows cross-view images within the axial boundary of the detected perforation of FIG. 5B. For clarity, FIGS. 5A, 5B, and 5C are best viewed together in the following description.

Perforation sizing 140 includes a preprocessing 541, which provides cross-view images 504 for the steps of key-point detection 542 and postprocessing 544. When the relevant cross-view images are available from a pre-processed cross-view images 104 in preprocessing 116 of FIG. 1, preprocessing 541 may select cross-view images 504 that are within the axial boundaries from the pre-processed cross-view images 104. Preprocessing 541 may otherwise generate, if no relevant cross-view images exist, cross-view images 504 that are within the axial boundaries defined by bounding box 476 in FIG. 4. The axial boundaries may also be provided manually or from an existing database if perforation sizing 140 is performed in a standalone mode. Perforation sizing starts with fine tuning the locations of top and end key points 1002, 1003 of the perforation using the axial-section view. The axial-section view is set using the center of the bounding box angle $\phi_p$, which was generated during the perforation detection. The trained key-point model generates the bottom and top locations of the current perforation. Cross-view images may be selected within the range defined by these bottom and top key points. Cross-view images 504 are then input to key-point detection 542. Key-point detection 542 uses cross-view images 504 at a given instant to identify the key points, which may include start point and end point, of the perforation at a given radial distance from the local center of acoustic probe 112.

Key-point detection 542, when using cross-view images 504, may be performed at an individual slice level from the cross-sectional view. Advantageously, cross-view images 504, which are slices that are parallel to r-$\phi$ plane, may be viewed in the polar coordinate system. The polar coordinate system may eliminate a scenario where half the perforation appears at the top and the other half at the bottom of the image. The appearance of the perforation has been shown to be more feature rich in the polar coordinates and may help to distinguish perforations from the similar-looking overlapping noise signals.

Postprocessing 544 uses the start and end points from key-point detection 542 on all respective slices and regularizes them to adhere to predefined constraints. Postprocessing 544 processes the spatial information in the sequence of frames to sample and correct the predicted shape of the perforation. The final step is spline fitting 546, which uses the final points determined from postprocessing 544 and performs a spline fitting which provides output perforation parameters 148. Output geometric perforation characteristics 148 include the corrected shape and the size of each perforation.

In an example use scenario, a tube view image 560 includes a perforation 580 that is classified as a potential perforation in perforation classification 120, FIG. 1. Tube view image 560 is an example of tube view image 102 and only shows a portion surrounding a potential perforation 580 for clarity. For example, tube view image 560 may be compared to one of the locations 282 that surround a potential perforation in processed image 280 in FIG. 2. FIG. 5B denotes section lines 562, 564, 566, and 568 that indicate the locations of cross-view images 572, 574, 576, and 578, respectively. Cross-view images 572, 574, 576, and 578 are examples of cross-view images 504 but are not meant to be an exhaustive list of cross-view images that are processed within the boundary of perforation 580. Cross-view images 572, 574, 576, and 578 show perforation 580 at various respective axial depths (top of tube view image 560 being near the start and the bottom of tube view image 560 being near the end of perforation 580): (i) cross-sectional perforation 582 at the start of perforation 580, (ii) cross-sectional perforation 584 near axial middle part of perforation 580, (iii) cross-sectional perforation 586 near the end of perforation 580, and (iv) cross-sectional perforation 588 at the end of perforation 580.

Cross-sectional perforation 584 in cross-view image 574 is shown expanded to indicate key points 592 and 594 that were detected by key-point detection 542. Key points 592 and 594 may be the start and end points of cross-sectional perforation 584. The detected key points from cross-view images including key points 592 and 594 are shown as key points 591 in tube view image 560. Using key points 591, a fitted perforation 593 is obtained by spline fitting 546. From fitted perforation 593, output perforation parameters 148 may be obtained. In this particular example, output perforation parameters 148 include a maximum extent length 597 of 0.339 inches and a maximum extent width 595 of 0.364 inches for an estimated perforation area of 0.100 square inches.

In embodiments, key-point detection 542 is a deep learning neural network algorithm for detecting endpoints of a perforation. Inputs to key-point detection 542 include single cross section images from the segments having positive images for perforation. Output of key-point detection 542 includes occurrences of the two endpoints of the perforation. The same principle and process of detecting such key points, as typically carried out by human operators, is applied to detect the end points of the perforations using machine learning.

In practice, despite many variations in the appearance of the perforation on an ultrasound image, some latent features are basic in all the perforations. These latent features of the perforation can be detected and localized by a deep convolution network. The training sample, which includes many variants of perforations, helps the deep feature learning convolution layers of the network to learn the various features of perforations present in ultrasound images and results in significant improvement in discriminating over similar looking noise signals.

In certain embodiments, neural network used for machine learning in key-point detection 542 includes a Region-based Convolutional Neural Network (R-CNN), or more specifically, Mask R-CNN. Mask R-CNN identifies occurrence of each object in a given image as a mask, as described in *Mask R-CNN* by Kaiming He et al., arXiv1703.06870 and is hereby incorporated by reference. This neural network architecture is preferred over others for its combination of speed and accuracy.

Figure 6A:
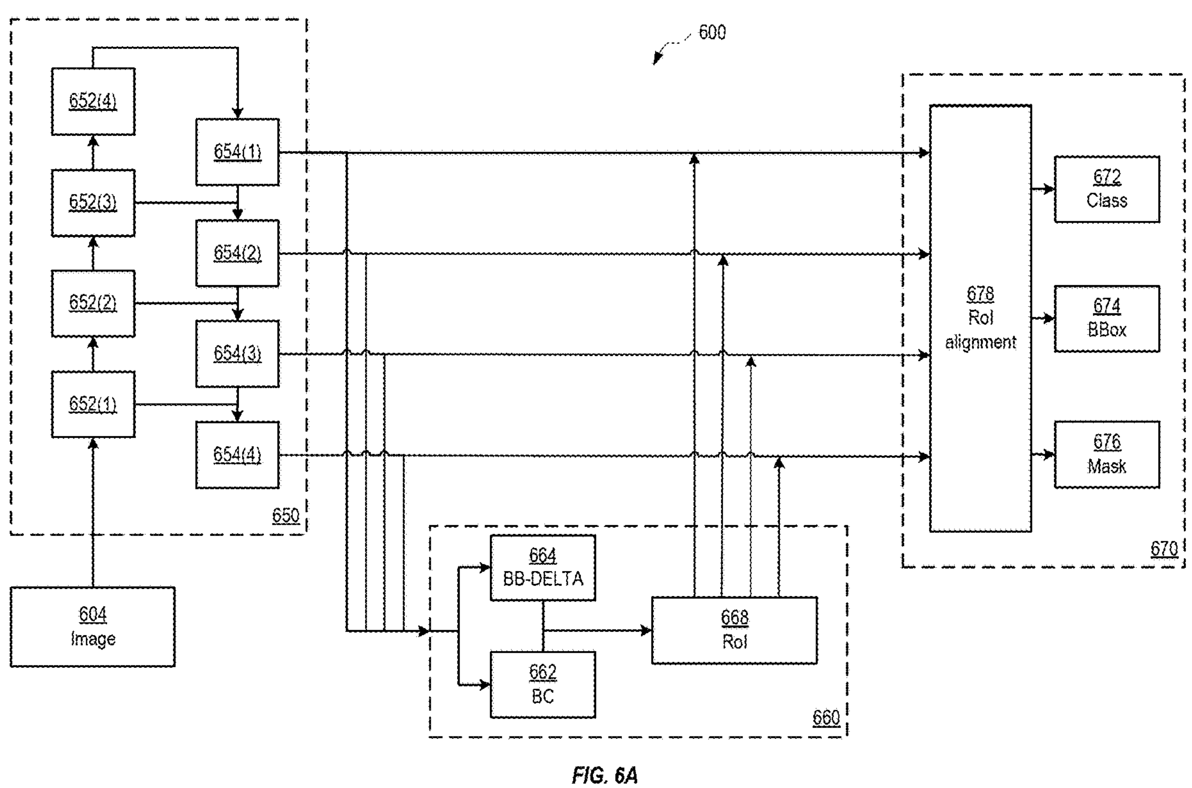
FIG. 6A is a block diagram of a neural network, based on a Mask Region-based Convolutional Neural Network model, in an embodiment.
Figure 6B:
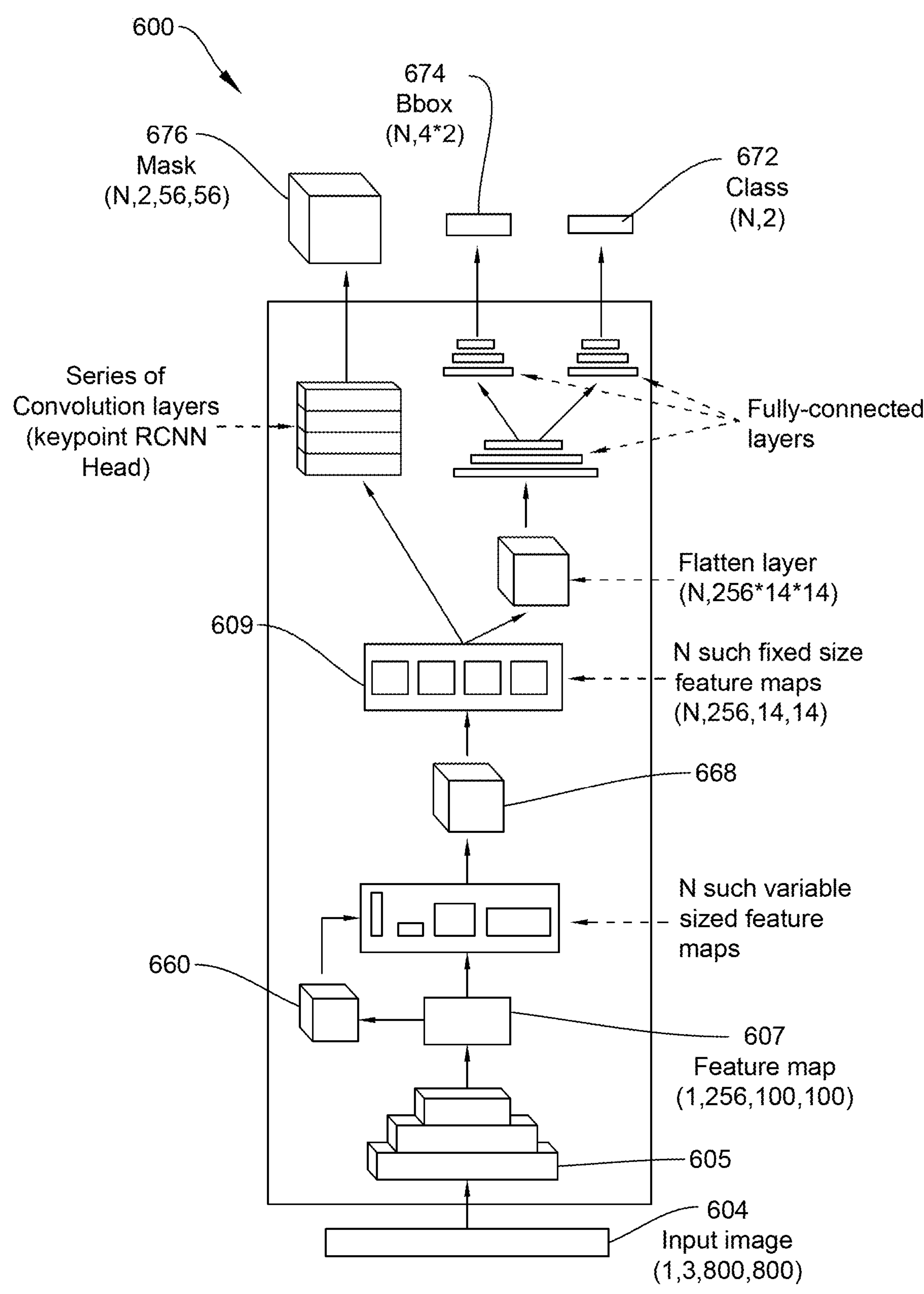
FIG. 6B is a block diagram providing further details shape of layers and outputs of the neural network of FIG. 6A.

FIGS. 6A and 6B are block diagrams of a neural network 600, based on Mask R-CNN model. For clarity, FIGS. 6A and 6B are best viewed together in the following description. Neural network 600 is an example neural network used in the step of key-point detection 542 in FIG. 5A and is based on Mask R-CNN. Advantageously, Mask R-CNN includes two stages: (i) generating proposals about the regions where there may exist an object in an image, and (ii) predicting the class of the object, which then refines the bounding box and generates a mask at pixel level of the object. Both stages are connected to the backbone structure, where the backbone is a feature pyramid network (FPN) style deep neural network, which is described in *A New Feature Pyramid Network for Object Detection* by Y. Zhao, R. Han, and Y. Rao, 2019 International Conference on Virtual Reality and Intelligent System (ICVRIS), 2019, pp. 428-431, and is hereby incorporated by reference.

Neural network 600 receives an image 604, which may be an example of cross-view image 104, and includes a backbone network 650, a regional proposal network (RPN) 660, and a mask representation 670. Backbone network 650 accepts image 604, where image 604 is first transformed into a feature space. Backbone network 650 includes a bottom-up pathway, a top-bottom pathway, and lateral connections. The bottom-up pathway 605 may be any CNN, such as Residual Network (ResNet), which extracts features from raw images. The bottom-up pathway includes convolution modules 652(*i*), where i is an integer smaller or equal to 4 as shown in the figure. While the figure shows four convolution modules or layers, fewer or more layers may be used. Each convolution module 652(*i*) reduces the spatial dimension by half from the previous convolution module 652(*i*−1). Top-bottom pathway generates a feature pyramid map that is similar in size to the bottom-up pathway. The top-bottom pathway includes up-samplers 654(*i*). Each up-sampler 654 (*i*) up-samples the spatial dimensions by a factor of two using the nearest neighbor. Each lateral connection merges feature maps of the same or similar spatial dimensions from the bottom-up and top-bottom pathways. Lateral connections are convolution and adding operations between two corresponding levels of the two pathways. The output of backbone network 650 includes feature maps 607 that are regions of interest extracted from different levels of the feature pyramid according to their scale.

RPN 660 accepts the feature maps 607 from backbone network 650 and proposes regions that may contain an object in form of binary classes (BC) 662 and bounding box (BB) deltas 664. RPN 660 may be a lightweight neural network that scans all layers of top-bottom pathway in backbone network 650. RPN 660 binds each feature to a raw image location using anchors, which are a set of boxes with predefined locations that scale to image 604. Region of Interest (RoI) 668 extracts a small feature map 609. BC 662 and BB deltas 664 are assigned to individual anchors according to IoU values. As anchors with different scales bind to different levels of the feature map 607, RPN 660 uses these anchors to locate an object in a feature map 607 and size the corresponding bounding box.

Mask representation 670 receives small feature maps 609 from RoI 668. Mask representation 670 includes RoI alignment 678, which receives proposed regions from RoI 668 in RPN 660 and assigns each region to specific areas at a feature map level. Output of mask representation 670 includes a bounding box (BBox) 674, a mask 676, and a class of the objects 672. Each of the resulting mask 676 has a region of pixels identified as a region of interest by, for example, each pixel having a value of one, and each of the remaining pixels having a value of zero. Each mask 676 may then be used to identify the location of a key point (e.g., start point or end point of a perforation).

Figure 7:
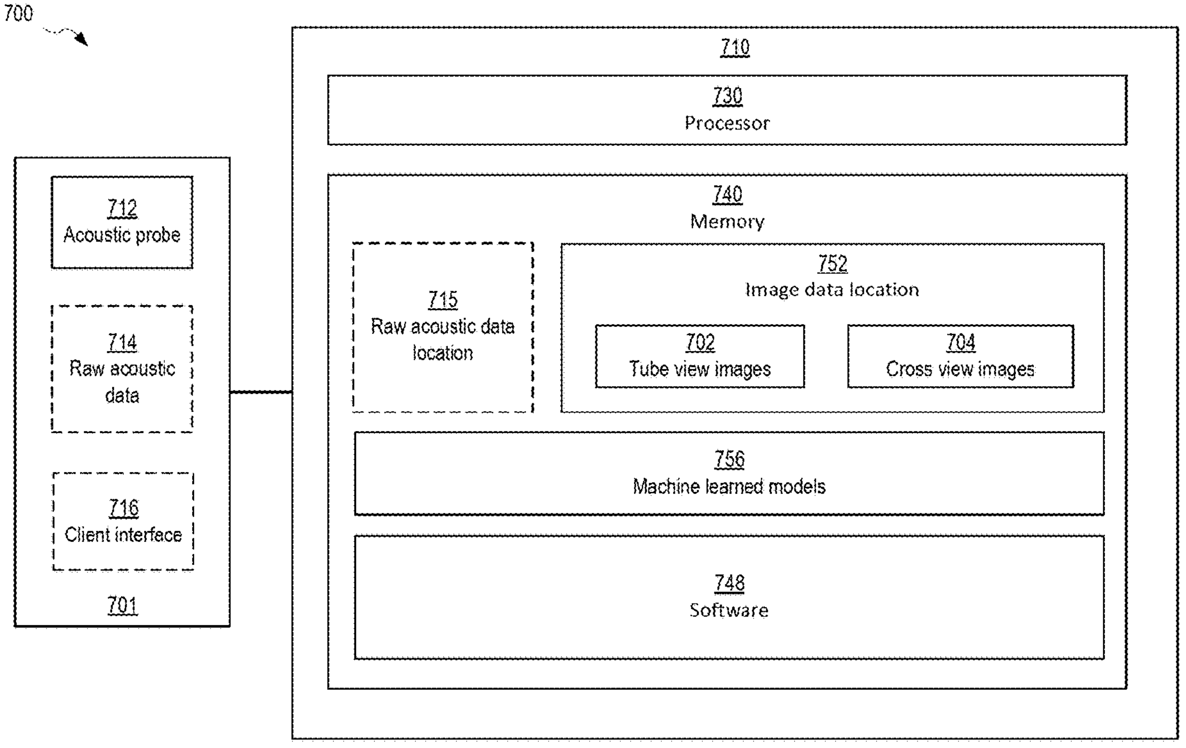
FIG. 7 is a block diagram of a system for characterizing perforations in a tubular, in an embodiment.

FIG. 7 is a block diagram of a system 700 for characterizing perforations in a tubular. System 700 includes an acquisition system 701 and a computing apparatus 710, which is an example of computing apparatus 110. Acquisition system 701 includes an acoustic probe 712, which is an example of acoustic probe 112 in FIG. 1. Acquisition system 701 may also include a memory for storing a raw acoustic data 714 and a client interface 716, such as a monitor for displaying, for example, an identified perforation. Acquisition system 701 is communicatively coupled to computing apparatus 710 and may relay at least raw acoustic data 714 to computing apparatus 710. Computing apparatus 710 may be located locally as a part of acquisition system 701 or remotely, such as on a cloud server.

Computing apparatus 710 includes a processor 730 and a memory 740. Memory 740 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 740 may be integrated into processor 730. Memory 740 stores non-transitory computer-readable instructions as software 748. When executed by processor 730, software 748 causes processor 730 to implement the functionality of characterizing perforations as described herein. Software 748 may be or may include firmware. Processor 730 may include a plurality of processors, each performing one or more of methods for perforation classification 120, perforation detection 130, and perforation sizing 140. Processor 730 may also implement additional methods, such as preprocessing 116.

Computing apparatus 710 receives raw acoustic data 714. Processor 730 may store raw acoustic data 714 in raw acoustic data location 715 memory 740 for processing. Processor 730, when performing preprocessing 116, converts raw acoustic data 714 into acoustic images of tube view images 702 and cross view images 704 and stores the acoustic images in an image data location 752. Memory 740 also includes machine learned models 756, which may include trained models for each neural network utilized in the system. Computing apparatus 710 may relay the results of characterizing perforations back to acquisition system 701 for displaying the results on client interface 716.

Figure 8:
FIG. 8 is a flowchart illustrating a method for measuring a perforation in a tubular, according to an embodiment.
Figure 8:
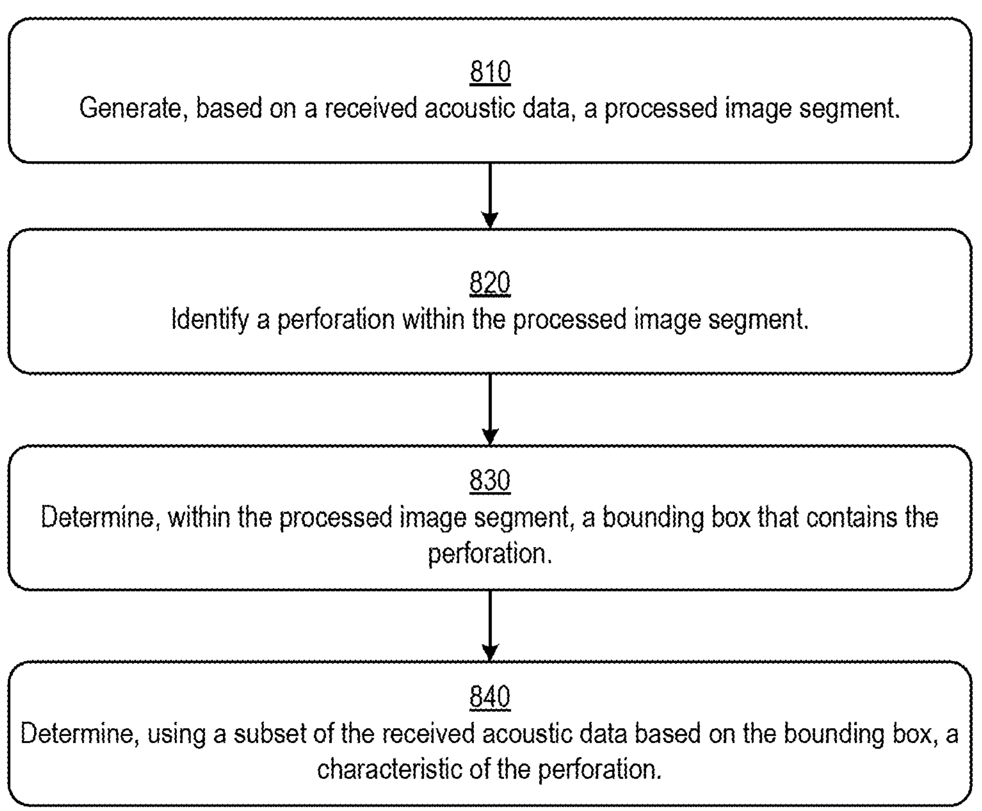

FIG. 8 is a flowchart illustrating a method 800 for characterizing a perforation in a tubular. In embodiments, method 800 is implemented within one or more aspects of system 700. In embodiments, method 800 is implemented by processor 730 executing computer-readable instructions of software 748. Method 800 includes steps 810, 820, 830, and 840, which may be performed sequentially. However, any of the steps 810, 820, 830, and 840 may be performed independently without performing the other steps. Method 800 may be used in a multistep data pipeline to accurately size perforations in a tubular.

Step 810 includes generating, based on a received acoustic data, a processed image segment. In an example of step 810, raw acoustic data 114 in FIG. 1, captured by acoustic probe 112, is uploaded to computing apparatus 110, which may be a cloud service. The raw acoustic data 114 undergoes preprocessing 116, which generates processed images including processed image segments 302 in FIG. 3.

Step 820 includes identifying a perforation within the processed images segment. In an example of step 820, neural network 380 in FIG. 3 identifies whether a potential perforation is present in each processed image segment 302 from step 810. When at least one potential perforation is identified in output 382 of neural network 380, the processed image segment 302 is stored in memory 377 for further processing.

Step 830 includes determining, within processed image segment 302, a bounding box that contains the perforation. In an example of step 830, neural network 480 in FIG. 4 may be used to determine the bounding box 476 in processed image segment 302. Processed image segment 302 may further be divided in preprocessing 474 into a plurality of smaller processed image segments 402 prior to step 830 to improve processing efficiency.

Step 840 includes determining, using a subset of the received acoustic data based on the bounding box, a characteristic of the perforation. In an example of step 840, preprocessing 541 in FIG. 5A generates, from raw acoustic data 114, a plurality of cross-view images 504 that are within the axial range defined by bounding box 476 of step 830. Cross-view images 504 are input to key-point detection 542, which detects key points of the perforation including start and end points of the perforation. The key points are then used to determine output perforation parameters 148. Some or all parts of step 840 may be performed by method 900 in FIG. 9.

Figure 9:
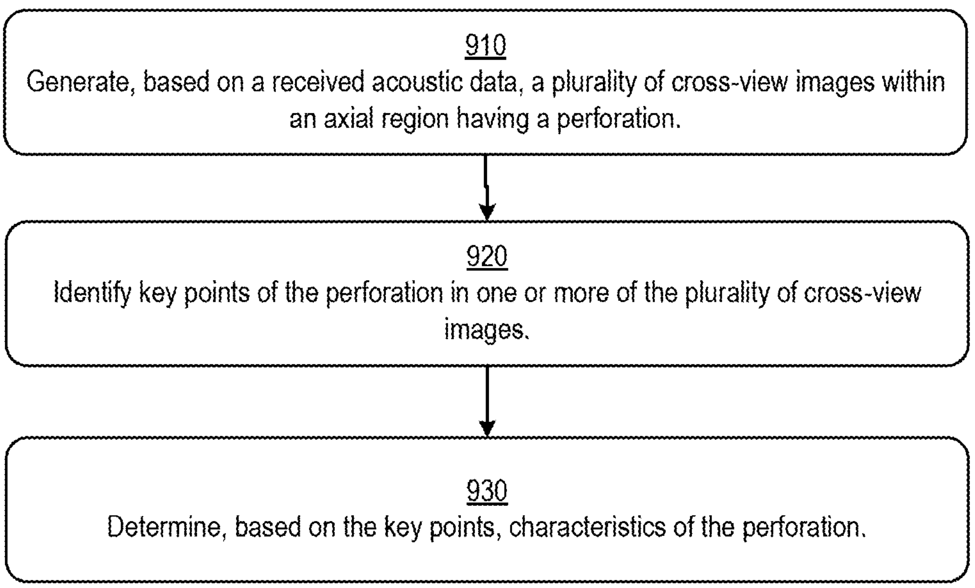
FIG. 9 is a flowchart illustrating a method for characterizing a perforation in a tubular.

FIG. 9 is a flowchart illustrating a method 900 for characterizing a perforation in a tubular. Method 900 may be performed standalone or follow method 800. In embodiments, method 900 is implemented within one or more aspects of system 700. In embodiments, method 900 is implemented by processor 730 executing computer-readable instructions of software 748. Method 900 includes steps 910, 920, and 930, which may be performed sequentially. However, any of the steps 910, 920, and 930 may be performed independently without performing the other steps. Method 900 may be used in a multistep data pipeline to accurately size perforations in a tubular.

Step 910 includes generating, based on a received acoustic data, a plurality of cross-view images within an axial region having a perforation. As an example of step 910, preprocessing 541 generates a plurality of cross-view images 504 that are within the axial boundaries having a perforation. When method 900 follows method 800, the axial boundaries are defined by the bounding box 476 of FIG. 4. When method 900 is performed standalone, the axial boundaries may be provided manually by a human operator or from an existing database.

Step 920 includes identifying key points of the perforation in one or more of the plurality of cross-view images. In an example of step 920, the step of key-point detection 542 in FIG. 5A identifies key points of start and end points of the perforation in a plurality of cross-view images 504. Step 920 may include using a trained neural network for identifying the key points.

Step 930 includes determining, based on the key points, characteristics of the perforation. In an example of step 930, the step of spline fitting 546 in FIG. 5A, using the key points identified in step 920, determines output perforation parameters 148 that may include the size of the perforation.

The invention claimed is:

1. A method of characterizing perforations in a tubular, comprising:

generating processed image segments, based on a received acoustic data for acoustic reflections from the tubular;

convolving a first trained neural network with the processed image segments to identify processed image segments containing a perforation; and convolving a second trained neural network on those processed image segments containing a perforation to output bounding boxes that locate the perforations along the tubular.

2. The method of claim 1, wherein the first trained neural network is a classification network that outputs a label estimating a probability of a given processed image segment containing a perforation.

3. The method of claim 1, wherein the first trained neural network comprises a Convolutional Neural Network and a Long Short Term Memory network.

4. The method of claim 1, wherein the first trained neural network comprises a UNET network.

5. The method of claim 1, wherein the first trained neural network comprises a first network part to output a feature for each of the processed image segments and a second network part that combines features for a sequence of the processed image segments to output a label that identifies perforations.

6. The method of claim 1, further comprising convolving a third trained neural network on a subset of the received acoustic data based on the bounding box to determine a geometric characteristic of the perforations.

7. The method of claim 1, wherein generating the processed image segments includes creating a single-channel image segment, where each region of the single-channel image segment includes a maximum measured intensity from a within a thickness of the tubular.

8. The method of claim 1, wherein generating the processed image segments includes creating a multi-channel image segment, where each region of the multi-channel image segment includes (i) a maximum measured intensity, (ii) a maximum measured intensity between an inner surface and an outer surface of the tubular, and (iii) a maximum measured intensity at the outer surface of the tubular at a corresponding azimuthal and axial location of the received acoustic data.

9. The method of claim 1, further comprising dividing the processed image segments into a plurality of smaller processed image segments prior to the step of determining the bounding box.

10. The method of claim 1, wherein the processed image segments have dimensions corresponding to azimuthal ($\phi$) and axial (z) directions of the tubular.

11. The method of claim 1, wherein the processed image segments have dimensions corresponding to azimuthal ($\phi$) and radial (r) directions of the tubular.

12. The method of claim 1, further comprising rendering and outputting an image from the received acoustic data based on least one of the identified processed image segments that contain a perforation.

13. A method of characterizing a perforation in a tubular, comprising:

generating, based on a received acoustic data, an image segment containing a perforation and a corresponding bounding box around the perforation;

identifying key points of the perforation in the image segment using a trained neural network model; and determining, based on the key points, geometric characteristics of the perforation.

14. The method of claim 13, generating processed image segments, based on a received acoustic data for acoustic reflections from the tubular.

15. The method of claim 13, wherein the image segment is a cross-view having dimensions corresponding to radial (r) and azimuthal ($\phi$) directions of the tubular.

16. The method of claim 13, wherein the image segment is a tubeview having dimensions corresponding to axial (z) and azimuthal ($\phi$) directions of the tubular.

17. The method of claim 13, wherein the geometric characteristics include a size of the perforation.

18. The method of claim 13, wherein the key points include a start point and an end point of the perforation.

19. The method of claim 17, wherein determining characteristics includes measuring the size of the perforation by spline fitting a start point and an end point.

20. A system for characterizing a perforation in a tubular, comprising:

an acoustic probe comprising a plurality of ultrasonic sensors, each sensor capable of transmitting and receiving ultrasonic waves, wherein the acoustic probe is configured to generate acoustic data; at least one processor; and at least one memory storing a first and a second trained neural network;

the at least one memory communicatively coupled with the at least one processor and storing machine-readable instructions that, when executed by the processor, cause the processor to:

generate processed image segments, based on the acoustic data;

convolve the first trained neural network with the processed image segments to identify processed image segments containing a perforation; and convolve the second trained neural network on those processed image segments containing a perforation to output a bounding box that locates the perforation along the tubular.

21. A system for characterizing a perforation in a tubular, comprising:

an acoustic probe comprising a plurality of ultrasonic sensors, each sensor capable of transmitting and receiving ultrasonic waves, wherein the acoustic probe is configured to generate acoustic data;

at least one processor; and at least one memory storing a trained neural network;

the at least one memory communicatively coupled with the at least one processor and storing machine-readable instructions that, when executed by the processor, cause the processor to:

generate, based on a received acoustic data, an image segment containing a perforation;

identify key points of the perforation in the image segment using a trained neural network model; and determine, based on the key points, geometric characteristics of the perforation.

22. The system of claim 21, the processor and the memory being located at a remote data center.

23. The system of claim 21, further comprising a user interface capable of displaying a rendered image and capable of receiving user prompts indicating which image segments contain a perforation.

* * * * *